United States Patent [19]

Baum

[11] 3,779,299

[45] Dec. 18, 1973

[54] TIRE STUD

[75] Inventor: Charles S. Baum, St. Clair Shores, Mich.

[73] Assignee: Permanence Corporation, Detroit, Mich.

[22] Filed: May 15, 1970

[21] Appl. No.: 37,708

[52] U.S. Cl. .............................. 152/210, 29/527.1
[51] Int. Cl. ........................................... B60c 11/16
[58] Field of Search.................... 152/210; 29/527.1, 29/.5

[56] References Cited
UNITED STATES PATENTS

| | | | |
|---|---|---|---|
| 3,125,147 | 3/1964 | Hakka | 152/210 |
| 3,480,062 | 11/1969 | Jillhouse | 152/210 |
| 3,089,196 | 5/1963 | Knapp | 29/527.1 |
| 3,426,822 | 2/1969 | Trendowski | 152/210 |
| 3,301,300 | 1/1967 | Natter | 152/210 |
| 2,034,550 | 3/1936 | Adams | 29/527.5 |
| 3,482,259 | 12/1969 | Schwartz | 29/537.1 |
| 3,301,300 | 1/1967 | Natter | 152/210 |
| 3,532,148 | 10/1970 | Kolbl | 152/210 |

FOREIGN PATENTS OR APPLICATIONS

| | | | |
|---|---|---|---|
| 429,613 | 9/1911 | France | 152/210 |

Primary Examiner—Gerald M. Forlenza
Assistant Examiner—D. W. Keen
Attorney—Barnard, McGlynn and Reising

[57] ABSTRACT

A tire stud and the method of making same. The tire stud includes an elongated metal body having a head at one end and a shank extending from the head with a cavity extending into the shank toward the head. In making the completed stud, the body is disposed in a bore having a shank receiving portion and a smaller portion which is generally of the same cross sectional area as the cavity and which extends upwardly from the cavity to an opening. Material is disposed through the opening to fill the cavity and at least a part of the smaller portion of the bore above the cavity. These materials include particles made of carbon grains sintered together by a binder such as cobalt and an additional filler metal powder. The filler metal powder is melted so as to fill the spaces between the particles and thereafter solidifies to form a composite of the particles bonded together by the filler material.

10 Claims, 4 Drawing Figures

PATENTED DEC 18 1973

3,779,299

INVENTOR
Charles S. Baum
BY
Barnard, McGlynn & Reising
ATTORNEYS

TIRE STUD

This invention relates to a stud for pneumatic snow tires, the stud being imbedded in the rubber or other elastomeric material of the tire to provide increased traction.

As is well known, that portion of the stud which is to engage the roadway must be of very tough, wear-resistant material. By far, the most commercially successful tire stud is of the type comprising an elongated metal body with a head on one end and a bore extending into the body with a sintered tungsten carbide insert secured in the bore and extending therefrom for engaging the pavement. Until now, those skilled in the art believed that carbides such as sintered tungsten carbide formed into an insert body were the only practical materials to use to obtain the requisite wear characteristics. An example of such a stud is shown in U.S. Pat. No. 3,125,147.

Sintered tungsten carbide comprises individual grains of carbide bound together by a binding metal such as cobalt. Other binding materials may be utilized but cobalt is preferred and is most widely used because cobalt dissolves only about one percent of the tungsten carbide and has a superior ability to wet the carbide at elevated temperatures as during sintering.

Sintered tungsten carbide is frequently manufactured by placing a tungsten carbide powder with a cobalt powder in a ball mill for crushing and thereafter screening the crushed mixture and pressing this mixture into a form. Thereafter, the form is sintered by placing it in a furnace or oven and elevated to a temperature that melts the cobalt. By comparison, a tire stud made in accordance with the instant invention is much less expensive.

One of the operational problems associated with the present tire studs which have a metal body with the tungsten carbide extending therefrom, is that the wear of the tungsten carbide is not commensurate with the wear of the metal body and the tire. The metal body surrounding the tungsten carbide wears rapidly compared to the tungsten carbide, as does the tire. Frequently, the elongated length of tungsten carbide is sharpened during wear and is forced back into the tire to puncture the tire. In other words, one of the problems with the present tire studs utilizing tungsten carbide is that the tungsten carbide is too wear resistant.

Accordingly, it is an object and feature of this invention to provide an improved tire stud used to overcome the economic and operational disadvantages of the prior art tire studs.

In correlation with the foregoing object and feature, it is another object and feature of this invention to provide an improved tire stud which utilizes presently used carbide but is in a different form which is more economical to manufacture and which provides the desired wear characteristics.

In correlation with the foreoing objects and features, it is another object and feature of this invention to provide a tire stud employing particles made up of grains of carbide sintered together by a binder metal with the particles in turn being bonded together by a filler metal.

In correlation with the foregoing objects and features, it is another object and feature of this invention to provide a tire stud employing particles made up of grains of tungsten carbide sintered together with cobalt as a binder with these particles in turn being bonded together by copper or nickel.

Other objects and attendant advantages of the present invention will be readily appreciated as the same becomes better understood by reference to the following detailed description when considered in connection with accompanying drawings wherein.

Referring now to the drawings wherein like numerals indicate like or corresponding parts throughout the several views, a tire stud constructed in accordance with the instant invention is generally shown at 10.

Figure 1:
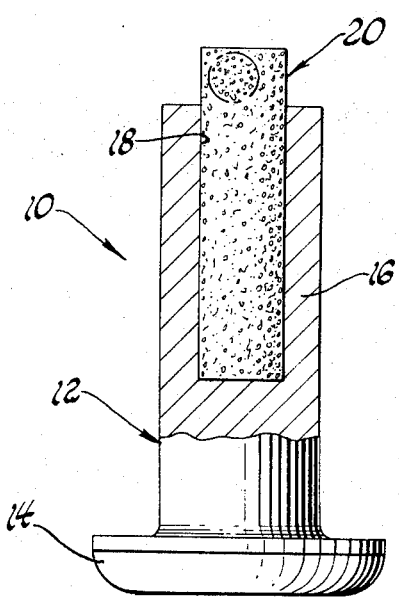
FIG. 1 is a fragmentary cross sectional view showing a preferred embodiment of a tire stud manufactured in accordance with the instant invention.
Figure 2:
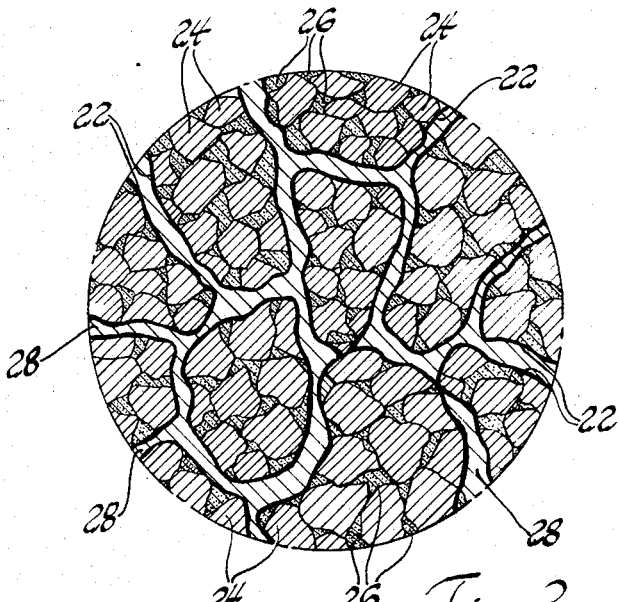
FIG. 2 is an enlarged view of the materials shown in the circle indicated in FIG. 1.

The tire stud 10 includes a metal body generally indicated at 12. The body 12 has opposite ends with a head 14 at one end and a shank portion 16 extending from the head 14 to the opposite end. A cavity 18 extends into the opposite end and terminates short of the head 14. The outer configuration of the body 12 is bolt-like in that the shank portion is circular. The body 12 is made of a metal such as steel.

A composite body, generally indicated at 20, is disposed and retained in the cavity 18 and extends from the cavity and the body 12.

The composite body 20 includes particles 22 made up of carbon grains 24 sintered together with a binder metal 26. The particles 22 are bound together by a filler metal 28 surrounding and filling the spaces between and binding together the particles 22.

More specifically, the particles comprise tungsten carbide grains 24 sintered together with cobalt 26, i.e. the cobalt is the binder metal. The filler metal 28 is at least in part, i.e. an alloy, of the metal from the group comprising copper and nickel. In other words, the filler metal is either copper or nickel or an alloy thereof.

There is a plentiful supply of discarded carbide parts. As an example, tungsten carbide cutting inserts are disposed in milling head cutting wheels and after sufficient wear are thrown away and hence are known as "throwaway" inserts. Tons of these inserts are discarded daily in manufacturing plants which utilize milling machines or the like. These "tungsten carbide" tools are sintered tungsten carbide manufactured as set forth above and therefore comprise tungsten carbide grains sintered together with a binder metal such as cobalt. In accordance with the instant invention these discarded parts are crushed to obtain particles which will comprise tungsten carbide grains sintered together by cobalt.

Figure 3:
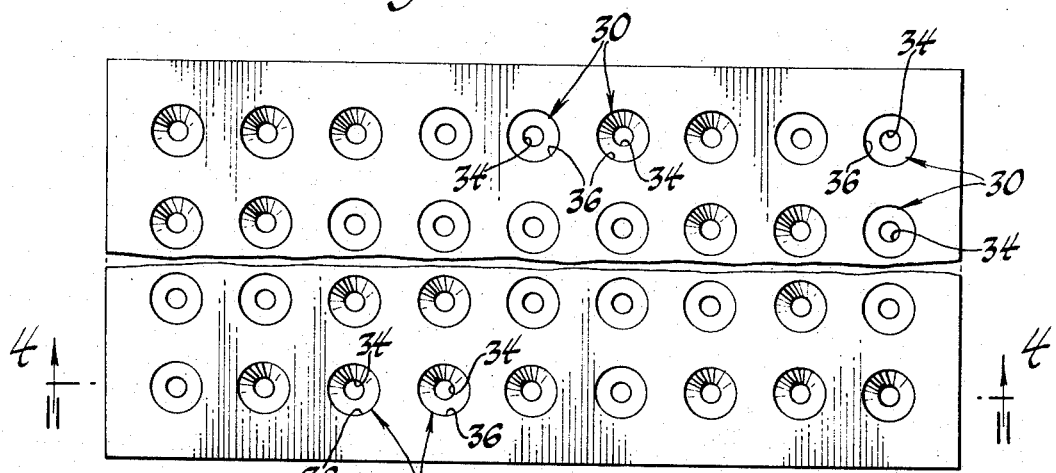
FIG. 3 is a plan view of a mold which may be utilized in manufacturing tire studs in accordance with the instant invention.
Figure 4:
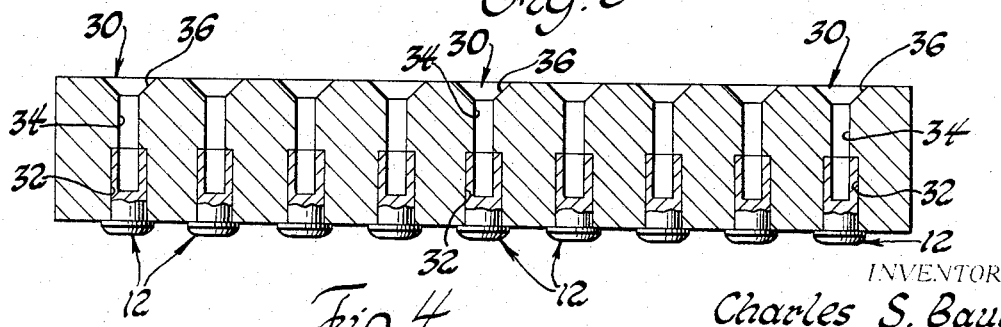
FIG. 4 is a cross sectional view taken substantially along line 4—4 of FIG. 3.

These particles are utilized in the instant invention by utilizing a mold such as that shown in FIGS. 3 and 4. The mold shown in FIGS. 3 and 4 includes a plurality of bores 30. Each bore 30 has a shank receiving portion 32 for receiving the shank 16 of the metal body 12. Each bore also includes a smaller portion 34 which is generally of the same cross sectional area or diameter as the cavity 18 and extends upwardly from the cavity 18 to a tapered opening 36.

In accordance with the instant invention, scrap parts are crushed to the desired particle size and the particles are disposed through the opening 36 to fill the cavity 32 in the metal member 12. Also inserted through the opening 36 is a powdered filler metal such as copper. The powdered metal and the particles may be premixed before disposition into the bores or the particles may be inserted first with the metal powder associated therewith by being disposed in a layer thereabove. In any case, the total combination fills the cavity 18 in the shank 16 and at least a length of the smaller portion 34 of the bore. Once this is accomplished the entire mold is placed in a furnace or oven and raised to a temperature for melting the powdered metal so that the filler metal 28 flows about particles 22 to fill the spaces therebetween. The composite is allowed to solidify by cooling whereby the particles 22 are bonded together by the filler material 28. The filler metal also adheres to the metal body to retain the composite in the cavity 18.

The tire stud 10 constructed in accordance with this invention when operatively associated with a tire, provides improved characteristics in that the composite insert 20 wears commensurately with the wear of the pedal body 12 and the tire and therefore overcomes the problems associated with the prior arc tire stud. The reason for the wear of the composite 20 being more commensurate with the wear of the metal body 12 and the tire is that the particles 22 provide all of the wear resistant characteristics known to previously utilized solid sintered tungsten carbide, yet the filler metal such as the copper or nickel negates to some degree such wearing characteristics so that the insert, albeit providing the requisite wear characteristics, is not so tough in wear resistance that problems are created.

It will be appreciated that since the basic tungsten carbide material may be purchased as scrap and merely crushed to the desired particle size, that tire studs constructed in accordance with the instant invention are much less expensive than tire studs using a solid insert of sintered tungsten carbide yet provides the requisite wear characteristics without being so tough so as to create problems associated with the prior art tire studs.

The mold may be subjected to a temperature of approximately 1,800 to 2,400 degrees F. to effect the melting of the filler material. When the filler material is copper it is preferably heated to a temperature sufficient for the copper to thoroughly wet the particles 22. Copper melts at about 1,850° F but it is preferably heated at least to a brazing temperature of 2,050° F so that a metalluragical bond occurs between the copper and the particles as the filler metal infiltrates the particles.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A tire stud comprising: a body having a head at an end opposite a roadway contacting end and a central cavity extending within said body generally normal to the head, a composite body adapted to engage a roadway and disposed in said cavity, said composite body including particles made up of a plurality of carbide grains sintered together with a binder metal, and a filler material surrounding and filling the spaces between and binding together said particles, said composite body breaking down at the roadway contacting end during use so as to be characterized by a wear rate commensurate with that of a tire tread.

2. A tire stud as set forth in claim 1 wherein said particles comprise sintered tungsten carbide.

3. A tire stud as set forth in claim 1 wherein said particles comprise tungsten carbide grains sintered together with cobalt as said binder metal.

4. A tire stud as set forth in claim 1 wherein said filler material is a metal at least in part from the group comprising copper and nickel.

5. A tire stud as set forth in claim 4 wherein said particles comprise tungsten carbide grains sintered together with cobalt as said binder metal.

6. An article including a composite body and adapted to be supported within a traction element so the composite body projects from the element to improve the frictional engagement of the traction element with a supporting surface, comprising: a body including an elongated shank and a cavity formed in the shank, said composite body disposed in said cavity, said composite body including particles made up of a plurality of carbide grains sintered together with a binder and a filler material surrounding and filling spaces between and binding together said particles, said article having a wear resistance commensurate with the traction element in which it is to be used.

7. The article of claim 6 wherein said traction element is a tire.

8. The article of claim 6 wherein the binder is a metal having a lower melting temperature than the particles.

9. The article of claim 8 wherein said binder metal includes cobalt.

10. The article of claim 6 wherein said particles comprise sintered tungsten carbide.

* * * * *